(12) United States Patent
Laird (10) Patent No.: US 8,279,040 B2
(45) Date of Patent: Oct. 2, 2012

(54) SYSTEM AND METHOD FOR CONTROL OF MULTIPLE BARRIER OPERATORS

(75) Inventor: Edward Thomas Laird, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 731 days.

(21) Appl. No.: 12/246,966

(22) Filed: Oct. 7, 2008

(65) Prior Publication Data

US 2010/0085145 A1 Apr. 8, 2010

(51) Int. Cl.
*B60R 25/00* (2006.01)
*G06F 9/32* (2006.01)
*H02P 1/54* (2006.01)
*H02P 5/00* (2006.01)
*E05B 53/00* (2006.01)

(52) U.S. Cl. ......... 340/5.7; 340/5.71; 340/2.1; 318/103; 318/112; 49/24

(58) Field of Classification Search .................... 340/5.7
See application file for complete search history.

(56) References Cited

U.S. PATENT DOCUMENTS

| | | |
|---|---|---|
| 2,564,510 A | 8/1951 | Shoemaker |
| 2,736,553 A | 2/1956 | Brown |
| 3,119,608 A | 1/1964 | Bateman |
| 3,135,469 A | 6/1964 | Hanson |
| 3,683,101 A | 8/1972 | Liberman |
| 3,699,235 A | 10/1972 | Wasson et al. |
| 3,725,568 A | 4/1973 | Stanley |
| 3,797,375 A | 3/1974 | Cerola |
| 3,931,452 A | 1/1976 | Nilsson |
| 4,062,052 A | 12/1977 | Harper et al. |
| 4,408,146 A | 10/1983 | Beckerman |
| 5,521,359 A | 5/1996 | Bone |
| 5,732,898 A | 3/1998 | Odessky et al. |
| 5,969,637 A | 10/1999 | Doppelt et al. |

(Continued)

FOREIGN PATENT DOCUMENTS

FR 2823022 10/2002

(Continued)

OTHER PUBLICATIONS

British Examination Report Under Section 13(3) Dated May 1, 2007; British Patent Application No. GB0509639.1.

(Continued)

*Primary Examiner* — Jennifer Mehmood
*Assistant Examiner* — John Mortell
(74) *Attorney, Agent, or Firm* — Fitch Even Tabin & Flannery LLP (57) ABSTRACT

A system for controlling operation of a plurality of movable barrier operators includes a controller configured to communicate with a plurality of movable barrier operators. The controller is programmed to receive a command to operate the plurality of movable barrier operators and to send a signal to start operation of a first movable barrier operator of the plurality of movable barrier operators in response to receiving the command. The controller is also programmed to send a signal to start a second movable barrier operator of the plurality of movable barrier operators at a time after sending the signal to start the operation of the first movable barrier operator. An arbitration of confirmation signals from the plurality of movable barrier operators may be used to determine the order of operation of the movable barrier operators.

37 Claims, 5 Drawing Sheets

U.S. PATENT DOCUMENTS

| | | | |
|---|---|---|---|
| 6,157,008 | A | 12/2000 | Brown et al. |
| 6,172,475 | B1 | 1/2001 | Fitzgibbon et al. |
| 6,184,641 | B1 | 2/2001 | Crimmins et al. |
| 6,198,047 | B1 | 3/2001 | Barr |
| 6,350,135 | B1 | 2/2002 | Acklin et al. |
| 6,870,141 | B2 | 3/2005 | Damrath et al. |
| 6,975,203 | B2 * | 12/2005 | Brookbank et al. ......... 340/5.26 |
| 7,302,775 | B2 | 12/2007 | Olmsted |
| 7,332,999 | B2 * | 2/2008 | Fitzgibbon ................... 340/5.71 |
| 7,688,014 | B2 * | 3/2010 | Tang et al. .................... 318/466 |
| 8,030,796 | B2 | 10/2011 | Fitzgibbon et al. |
| 2001/0010032 | A1 | 7/2001 | Ehlers et al. |
| 2005/0116541 | A1 | 6/2005 | Seiver |

FOREIGN PATENT DOCUMENTS

| | | |
|---|---|---|
| WO | WO0037748 | 6/2000 |
| WO | WO0221660 | 3/2002 |

OTHER PUBLICATIONS

British Search Report Under Section 17 Dated Aug. 3, 2005; British Patent Application No. GB0509639.1.

* cited by examiner

SYSTEM AND METHOD FOR CONTROL OF MULTIPLE BARRIER OPERATORS

TECHNICAL FIELD

This invention relates generally to barrier movement operators and more specifically to operation and control of multiple barrier operators.

BACKGROUND

Systems for operating and controlling barriers are well known to control various types of barriers such as garage doors, swinging gates, sliding gates, and the like. Over the years there has been an increasing trend to operate multiple barriers in a structure. For example, in the housing market, builders are increasingly constructing homes having three- or four-car garages. Also, businesses, particularly warehouses and automobile repair shops, have for many years used multiple door configurations. In many instances, either for reasons of aesthetics or practicality, garage configurations include multiple independent doors generally corresponding to the number of cars that may be housed within the garage. In each of the previously described environments, each door, therefore, often required its own barrier movement operator, or garage door opener (GDO).

As a way to efficiently open and close multiple doors, systems have been built that allow for operation of more than one barrier operator at the same time. Such systems may for example conveniently allow a business operator to close all the doors with a single button press at the end of the day or open all of the doors at the start of the day. Motors, such as induction motors, that drive the movable barrier operators, however, draw a significant amount of current during operation, especially at the start of its operation cycle. For instance, at start up a typical garage door operator motor can pull two to ten times the amount of current necessary during other portions of the motor's operation cycle. When operating multiple barrier operators, the current draw from the structure's power supply can be significant. For example, in some instances, the current draw may trip the circuit breaker, thereby disrupting a business or inconveniencing a homeowner.

SUMMARY

Generally speaking, pursuant to these various embodiments, a control system for a plurality of movable barrier operators controls the operation of the operators to limit the current draw from the operator motors. One example approach to a system for controlling operation of a plurality of movable barrier operators includes a system controller programmed to receive at least one command to operate a plurality of movable barrier operators and configured upon receipt of the command to communicate with the plurality of the movable barrier operators. The system controller is programmed to send a signal in response to the command to start the operation of a first movable barrier operator of the plurality of movable barrier operators. The system controller is programmed to send a second signal to start a second movable barrier operator at a time subsequent to the operation of the first movable barrier operator, and the second signal is controlled to be effective for limiting an amount of current being drawn by the system in starting operation of the movable barrier operators. The second operator's operation is timed to limit the amount of current being drawn by the system in starting operation of the movable barrier operators to approximately 12 amps, and may be tailored to the particular system or structure in which the operators are installed.

The subsequent controlling of the second movable barrier can be accomplished via any of a group of approaches. For example, the subsequent operation of the second movable barrier operator may be controlled by delaying the timing at which the second controller receives a control signal relative to the completion of the first movable barrier operator's movement the completion of its start up sequence. By another approach, the subsequent time may be a time at which the first movable barrier operator's movement or start up sequence is complete. By yet another approach, the subsequent time can be controlled by the signal to the operator wherein the signal to the movable barrier operator contains a command to start the operation with a delay that can be predetermined or communicated by the signal.

In another approach, the system determines the order of operation of the operators based upon receipt of confirmation signals from the operators. One such approach to the system for controlling operation of a plurality of movable barrier operators includes a network coupled to a plurality of movable barrier operators and a controller coupled to the network. The controller is programmed to receive a command to operate the plurality of movable barrier operators and to send a signal to start operation of the plurality of movable barrier operators in response to receiving the command. The controller is programmed to receive confirmation signals from the movable barrier operators according to an arbitration of the confirmation signals. The confirmation signals are signals from the barrier operators confirming receipt of the signal to start operation, but the operators do no operate until a second signal is received. Accordingly, the controller sends a signal to start operation of a first movable barrier operator of the plurality of movable barrier operators according to the arbitration of the confirmation signals by the network. The controller is programmed to send a signal to start operation of a second movable barrier operator of the plurality of movable barrier operators according to the arbitration of the confirmation signals by the network at a time after sending the signal to start the operation of the first movable barrier operator. So configured, the arbitration of the confirmation signals from the movable barrier operators helps determine the sequencing of the activation of the motors to limit the maximum current draw.

A method of operating such a system includes receiving a command to operate a plurality of movable barrier operators and sending a signal to the plurality of movable barrier operators to operate in response to receiving the command to operate the plurality of movable barrier operators. The method includes receiving confirmation signals from the movable barrier operators according to an arbitration of the confirmation signals and operating the plurality of movable barrier operators in an order of receipt of the confirmation signals according to the arbitration of the confirmation signals. The method may include delaying operation of a movable barrier operator for a time after operating a first movable barrier operator in the order of receipt of the confirmation signals according to the arbitration of the confirmation signals.

By another approach, the method for controlling operation of a plurality of movable barrier operators to operate in a sequential manner includes receiving a command to operate a plurality of movable barrier operators and sending a signal to a first movable barrier operator of the plurality of movable barrier operators to operate in response to receiving the command to operate the plurality of movable barrier operators. The method by this approach includes sending a signal to a second movable barrier operator of the plurality of movable barrier operators to operate in response to receiving the command to operate the plurality of movable barrier operators at a subsequent time after sending the signal to start the operation of the first movable barrier operator.

So configured, the system controls the operation of the movable barrier operators such that operation of more than one movable barrier operator occurs in a sequence to reduce the chance that excess current is drawn by the operators at any one point in time. By so managing the operators' start up sequences, the multiple barrier operators are less likely trip circuit breakers for the garage, warehouse, or other structure in which the multiple barriers are disposed. Similarly, more sophisticated energy management for the structure, such as those structures as may have energy usage limits, may be assisted by such operator controller systems. These and other benefits may become clearer upon making a thorough review and study of the following detailed description.

BRIEF DESCRIPTION OF THE DRAWINGS

The above needs are at least partially met through provision of the system and method for control of multiple barrier operators described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENTS

Figure 1:
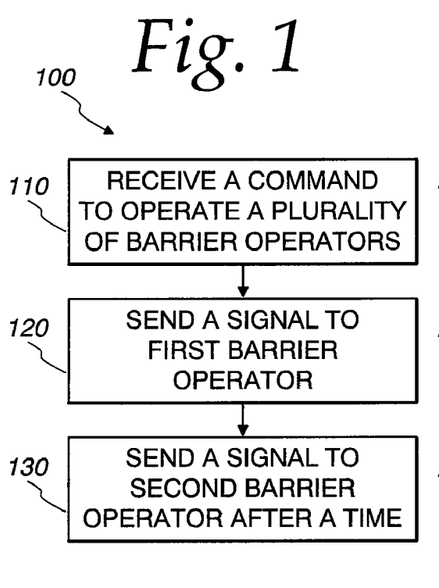
FIG. 1 comprises a flow diagram of a method of operation based upon timing of signals from a system controller as configured in accordance with various embodiments of the invention.

Referring now to the drawings and particularly FIG. 1, a method 100 for controlling operation of a plurality of movable barrier operators to operate in a sequential manner includes at step 110 receiving a command to operate a plurality of movable barrier operators. For instance, a single button on a control panel or wireless transmitter may be configured to send such a command to the system controller. In response to receiving the command to operate the plurality of movable barrier operators, at step 120 the system controller sends a signal to operate to a first movable barrier operator of the plurality of movable barrier operators. At a time subsequent to step 120, the system controller sends a signal at step 130 to a second movable barrier operator of the plurality of movable barrier operators.

The time subsequent to the time of sending a signal to operate the first movable barrier operator may be any one or more of a group of approaches. By one approach, the time subsequent is a time at which the first movable barrier operator's movement is complete. In such an approach, only one operator is drawing current at a time. By another approach, the delay time between sending signals to operate the first and second barrier operators may be a time at which the first movable barrier operator's start up sequence is complete. By this approach, only one operator is drawing the excess current that is typically drawn during a start up operation for the operator thereby limiting the maximum current draw that may be possible when multiple barrier operators execute a high current drawing start up sequence at the same time. Such delay times may be pre-programmed into the system controller and/or stored in memory at installation of the barrier operators or other appropriate time, such as during operation of a calibration mode of the operator.

In yet another approach, the delay time may be based on receiving timing or operation status signals from the operating movable barrier operator instead of relying on timing values stored by the system controller. For example, the delay time may be a time of receiving a signal from the first movable barrier operator that its movement is complete. Accordingly, instead of relying on a previously stored time of operation for a barrier operator to trigger a second barrier operator to begin operation, the system controller may wait for a status signal from the first barrier operator indicating that the first barrier operator is finished moving to send the signal to the second barrier operator. Similarly, the delay time may depend on a time of receiving a signal from the first movable barrier operator that its start up sequence is complete before sending a signal to operate a second movable barrier operator.

So configured, the system can substantially control or limit the amount of current drawn by the plurality of barrier operators by limiting the number of operator motors drawing current at any given time and/or by limiting the number of operator motors performing a start up operation at any given time. For instance, the second signal to start the second barrier operator can be timed to limit the amount of current being drawn by the system in starting operation of the movable barrier operators to approximately 12 amps, although the system current limit can be adjusted to fit particular system or structure requirements.

Figure 2:
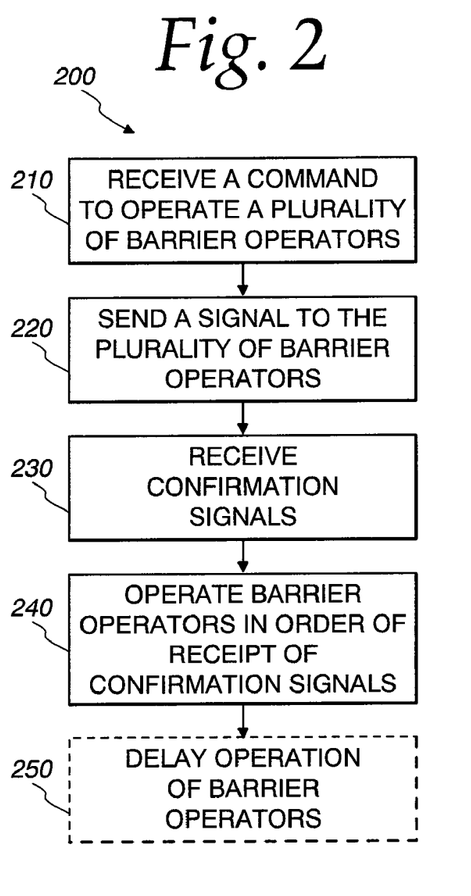
FIG. 2 comprises a flow diagram of a method of sequencing operation of barrier operators based on receipt of signals from the operators such as through arbitration as configured in accordance with various embodiments of the invention.

With reference to FIG. 2, another approach to the method 200 for controlling operation of a plurality of movable barrier operators to operate in a sequential manner will be described.

In such a system, the order of operation of movable barrier operators can be determined through the order of receiving signals from the operators. At step 210 a system controller receives a command to operate a plurality of movable barrier operators. In response to receiving the command to operate the plurality of movable barrier operators, at step 220, the system controller sends a signal to the plurality of movable barrier operators to operate. Before actuating the motors to move the barriers, the movable barrier operators send confirmation signals to the system controller that, at step 230, receives the confirmation signals according to an arbitration of the confirmation signals. The confirmation signals are sent by the movable barrier operators to signal that they received the initial signal to operate.

At step 240, the plurality of movable barrier operators are operated in an order based upon receipt of the confirmation signals according to the arbitration of the confirmation signals. In other words, by one approach, the movable barrier operator whose confirmation signal is received first by the system controller is operated first; the movable barrier operator whose confirmation signal is received second is operated second, and so on. By way of example, an operator that is located furthest away from the system controller may have its confirmation signal received by the system controller until after the system controller receives the other operators' confirmation signals. In this example, the operator located furthest away will be the last to operate because its confirmation signal is the last to be received by the system controller.

The system controller may be programmed to arbitrate the receipt of the confirmation signals by any suitable manner. Arbitration is a method by which signals from the barrier operators are ordered for receipt by the system controller. The arbitration can be implemented in software or firmware. For instance, the confirmation signals may be received simultaneously by the system controller thereby requiring a system to determine the ordering of the signals. By one approach, the system controller is connected to the movable barrier operators through a wired connection such as a serial bus connection. Serial bus connection systems have known arbitration methods to control receipt of multiple signals by a portion of the network. Accordingly, the system controller can arbitrate the receipt of confirmation signals (thereby determining the order of operation of the movable barrier operators) through use of the serial bus arbitration inherent the wired connection control of the serial bus configuration.

The serial bus arbitration of signal control may be implemented, for example, in software in other, non-serial bus connected networks. For instance, in a wireless network environment, software running at the system controller can implement the serial bus signal arbitration to control receipt of confirmation signals over a wireless network. Other suitable signal arbitration methods can similarly be implemented to control the receipt of the confirmation signals by the system controller. For example, in a given system, it may be desirable to operate a particular barrier operator before the others such that, in this system, the particular barrier operator confirmation signal is always arbitrated to be received first, leaving the remaining confirmation signals to be ordered by other arbitration means.

With reference again to FIG. 2, at step 250, operation of a second movable barrier operator is delayed for a time after operating a first movable barrier operator in the order of receipt of the confirmation signals. Typically, the delay time is sufficient to maintain reasonable levels of current draw by the plurality of movable barrier operators at described above with reference to FIG. 1. So configured, the system can actively control the sequence of operation of the movable barrier operators to control in part the overall current draw of the operators.

Figure 3:
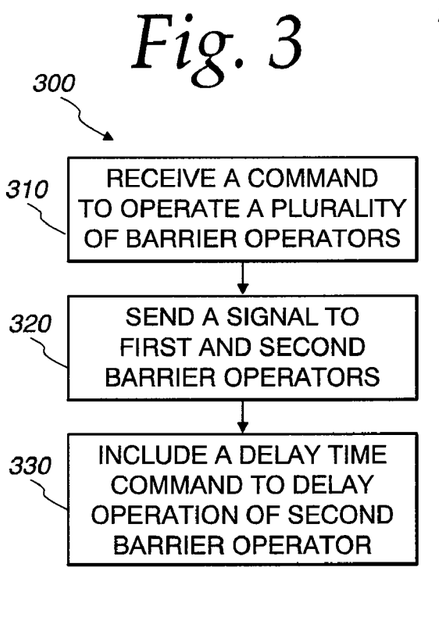
FIG. 3 comprises a flow diagram of a method of sequencing operation of barrier operators based on inclusion of a delay time as configured in accordance with various embodiments of the invention.

With reference to FIG. 3, yet another approach to the method 300 for controlling the movable barriers will be described. At step 310 a system controller receives a command to operate a plurality of movable barrier operators. In response to receiving the command to operate the plurality of movable barrier operators. At step 320, the system controller sends a signal to at least a first movable barrier operator and a second movable barrier operator of the plurality of movable barrier operators to operate in response to receiving the command to operate the plurality of movable barrier operators. At step 330 the signal to the first movable barrier operator and the second movable barrier operator includes a delay time command to operate the second movable barrier operator at a delay time after the first movable barrier operator.

Typically, the delay time is sufficient to maintain reasonable levels of current draw by the plurality of movable barrier operators at described above with reference to FIG. 1. By one approach, the delay time may be timed to limit an amount of current being drawn by the system in starting operation of the movable barrier operators to approximately 12 amps. For example, the delay time may be a time at which the first movable barrier operator's movement is complete or a time at which the first movable barrier operator's start up sequence is complete. The delay time may be preset with the system, determined by testing at the system site and stored in the system controller, or determined during operation by the system controller. So configured, the system can actively control the sequence of operation of the movable barrier operators to control in part the overall current draw of the operators.

Figure 4:
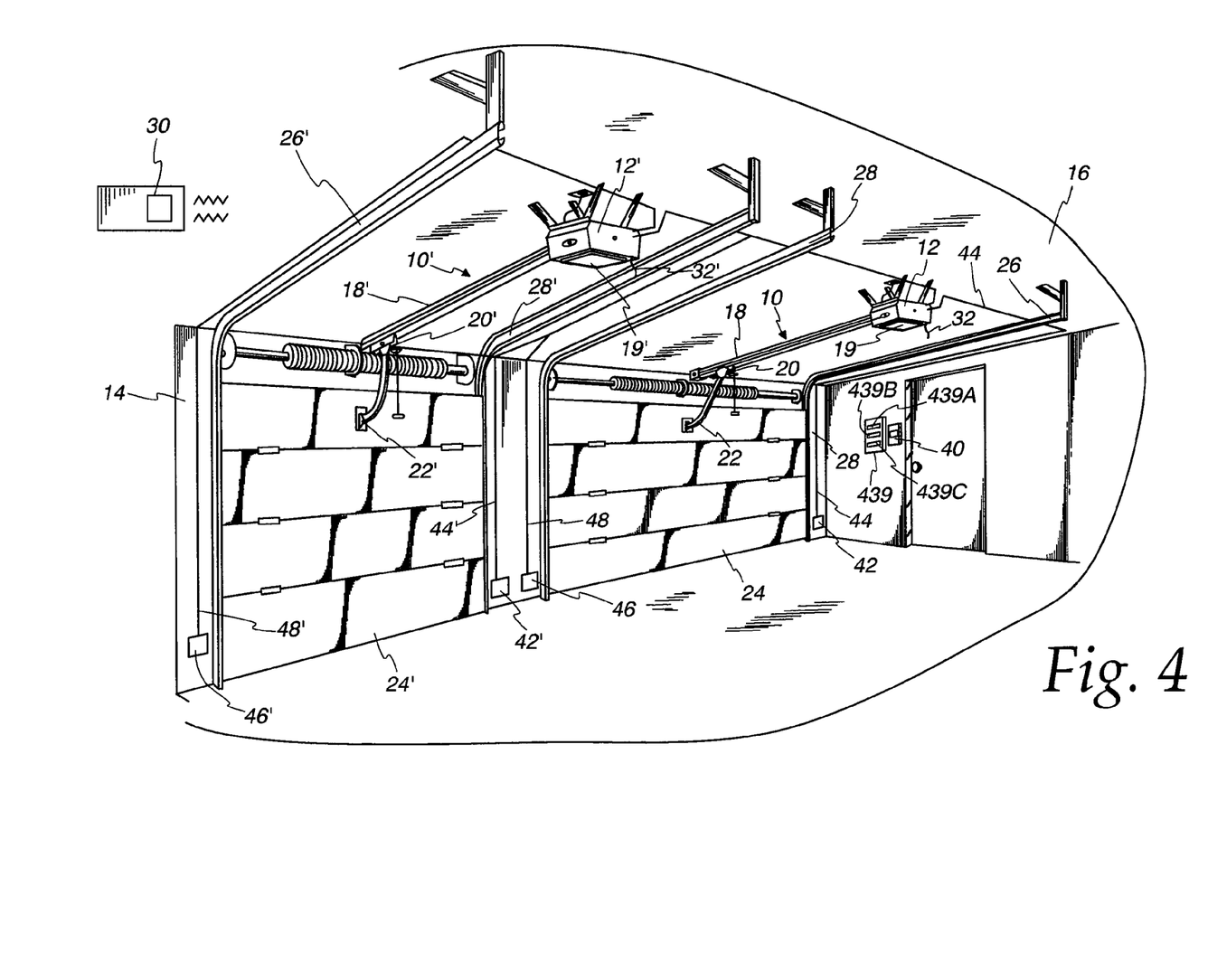
FIG. 4 comprises a perspective view of a garage as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a system will now be provided. A pair of movable barrier operators 10, 10' including head units 12, 12' mounted within a garage 14 and employed for controlling the opening and closing of the garage doors 24, 24' is generally shown therein. It is to be noted that for the purposes of discussion, only two movable barrier operators are shown and described in FIG. 4; however, additional barrier operators also may be employed as illustrated in other embodiments.

Referring to FIG. 4, the head units 12, 12' are mounted to the ceiling 16 of the garage 14. Each head unit 12, 12' includes a motor and an operator controller for controlling electrical power supplied to the motor. The operator controller for the movable barrier operator 10 responds to various inputs by starting and stopping the motor, which is used to move the barrier, and by turning a light 19 on and off. Extending from the head units 12, 12' are rails 18, 18', each having a releasable trolley 20, 20' attached thereto and arm 22, 22' extending from each trolley 20, 20' to multiple paneled garage doors 24, 24' positioned for movement along a pair of door rails 26, 26' and 28, 28'. The movable barrier operators 10, 10' transfer the garage doors 24, 24' between open and closed positions for allowing access to and from the garage 14.

For safety purposes, optical emitters 42, 42' and optical detectors 46, 46' are provided. These are coupled to the head units 12, 12' by a pair of wires 44, 44' and 48, 48', respectively. The emitters 42, 42' and detectors 46, 46' are used to provide safety of operation in barrier movement. To provide such safety of operation, the controller responds to the emitter and detector and will reverse and open the door in order to prevent damage to property and injury to persons if an obstruction is sensed in the doorway.

Figure 5:
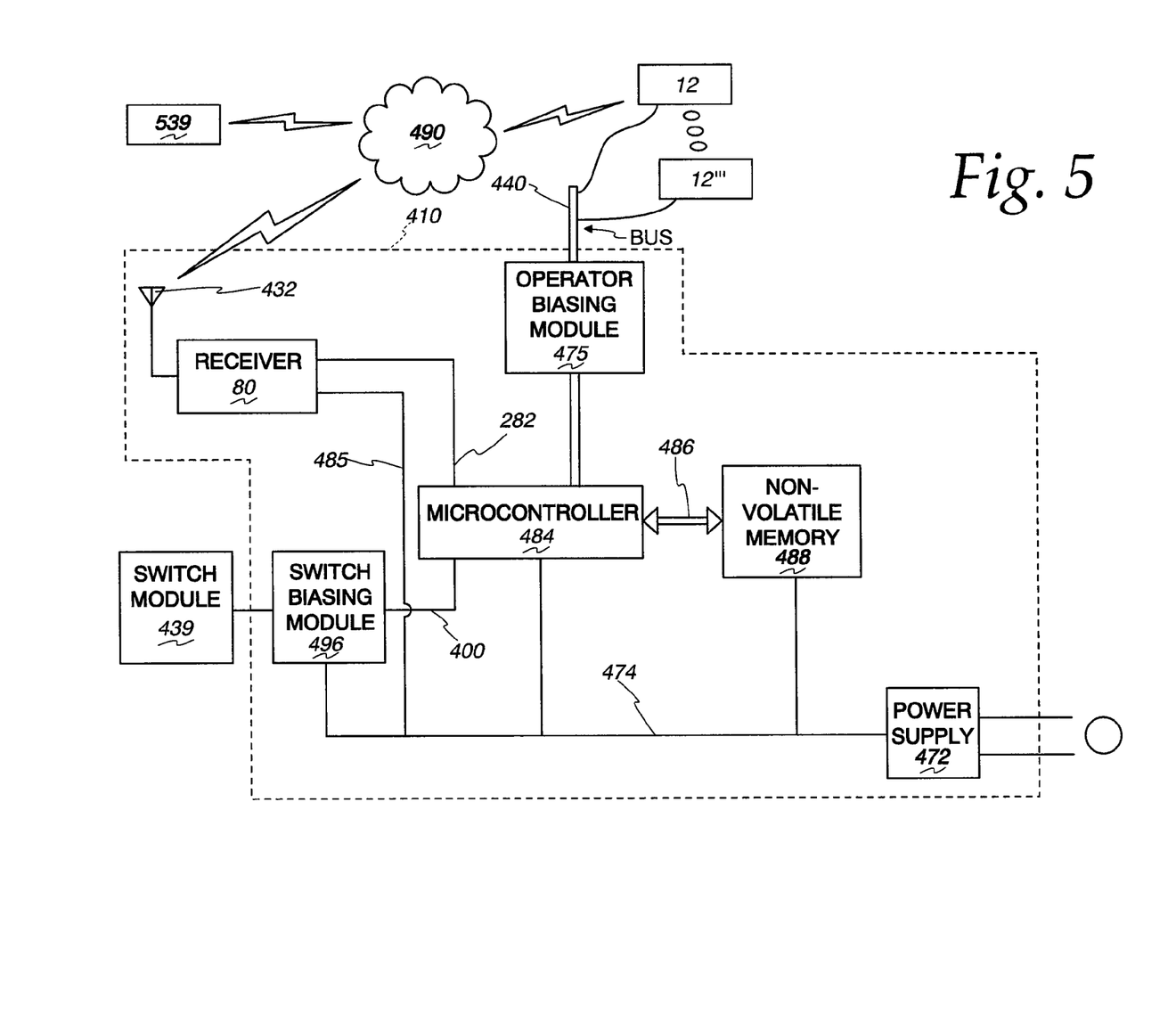
FIG. 5 comprises a block diagram of an example system controller as configured in accordance with various embodiments of the invention.

At least one hand-held transmitter unit 30 is adapted to send signals to the antennas 32, 32' positioned on or extending from each head unit 12, 12' or to a system controller 410 (FIG. 5). The antennas 32, 32' are coupled to their respective receivers located within the head units 12, 12'. A switch module 439, which may include any number of switches as required for a given system, as further described in detail below, is mounted on a wall of the garage 14. In the embodiment shown in FIG. 4, the switch module 439 communicates with the head units 12, 12' through a wired means of communication. In a wired link, the switch module 439 is physically wired to each installed head unit 12, 12' and communicates with each head unit 12, 12' using any commonly known method of communication, including serial bus communication. In another embodiment, as discussed below, the switch module communicates with the head units 12, 12' using wireless signals, such as radio frequency (RF) or infrared.

Referring again to FIG. 4, a motion detector 40 is provided for detecting movement inside the garage 14. Unlike an obstacle detector that detects a break in an optical beam transmitted between the optical emitters 42, 42' and the optical detectors 46, 46', the motion detector 40 may be a passive infrared (PIR) detector, ultrasonic, or other device that is capable of detecting either body heat or motion, without requiring a beam to be broken. The motion detector 40 also may be wired or wireless. The motion detector 40, in a wired configuration, is connected to the operator using either the same wires as used by a wired switch module, or by a separate set of wires connected to the operator. In a wireless configuration, the motion detector 40 includes a transmitter and communicates with the operator via a receiver and antenna. It is to be noted that the motion detector 40 is capable of operating in a mixed mode environment. For example, the motion detector 40, either in a wired or wireless configuration, is able to communicate with the operator regardless of whether the switch module 439 is connected to the operator in a wired or wireless configuration.

The motion detector 40 transmits a signal instructing the operator to either illuminate or turn off the overhead light. Advantageously, in a wireless configuration, the motion detector maybe located anywhere inside the garage. The transmitted signal from the motion detector 40 is the same as that transmitted by any other wireless controller, such as the wireless switch module 539, and maybe integrated in the wireless switch module.

For security purposes, a signal response inhibit feature, referred to commonly as vacation or lock mode, is provided in the barrier operator such that it ignores or inhibits barrier operator response to switch commands from any handheld transmitter, such as hand-held transmitter 30 from opening the barrier. Setting and disabling the inhibit feature is possible using codes from the switch module 439. When a code is detected and then subsequently determined as not having been sent by the switch module 439, the operator checks whether a response inhibit flag is set in its memory indicating that the system is in response inhibit or lock mode. If the response inhibit flag is set, the received code is ignored and the barrier is not moved unless a code or command is received from the switch module 439 instructing the barrier to exit lock mode or to move the barrier to a specific location such as the up limit.

An additional security/convenience feature is the provision of overhead lights 19, 19'. The head units 12, 12' include overhead lights 19, 19' for illuminating the interior of the garage in which the head units 12, 12' are located. The lights 19, 19' are activated or deactivated either by pressing the appropriate switch on the switch module 439 or by breaking the optical beam that runs between the optical emitters 42, 42' and the optical detectors 46, 46'.

Referring to FIG. 5, the system controller 410 includes an antenna 432 and a power supply 472 that receives alternating current from an alternating current source, such as 110 volt AC, and converts the alternating current to +5 volts. By another approach, the power supply 472 may comprise one or more batteries. The 5 volt supply is fed along a line 474 to a number of other elements in the system controller 410. The system controller 410 includes a receiver 480 coupled via a line 482 to supply demodulated digital signals to a microcontroller 484. The receiver 480 is energized by a line 485 coupled to the line 474. In a wireless configuration, signals may be received by the system controller 410 at the antenna 432 and fed to the microcontroller 484 via the receiver 480.

The microcontroller 484 is coupled by a bus 486 to a non-volatile random access memory (NVRAM) 488, which stores data related to the operation of the system controller 410. In a wired configuration, the switch module 439 is connected to a switch biasing module 496 that is powered from the 5 volt supply line 474 and supplies signals to and is controlled by the microcontroller 484 via a bus 400 coupled to the microcontroller 484. The system controller 410 in a wired approach is connected to the barrier operator head units 12, 12', 12", 12''' via a connecting wire 440. The connecting wire 440 may comprise a network connection and/or a network bus with an operator biasing module 475.

In one approach, the microcontroller 484 in response to signals from the switch module 439 or wireless switch module 539 (FIG. 6) sends signals over the serial bus connection 440 to the barrier operator head units 12, 12', 12", 12'''. An operator biasing module 475 is optionally included to control the exchange of signals over the bus 440. By another approach, the microcontroller 484 sends signals wirelessly through a wireless network 490 to the barrier operator head units 12, 12', 12", 12'''. Those skilled in the art will recognize and appreciate that such a microcontroller 484 can comprise a fixed-purpose hard-wired platform or can comprise a partially or wholly programmable platform. All of these architectural options are well known and understood in the art and require no further description here.

In one configuration, the system for controlling operation of a plurality of movable barrier operators includes the system controller 410 being configured to communicate with a plurality of movable barrier operator head units 12, 12', 12", 12''', for example, through the wireless network 490 or through a wired network 440. The system controller 410 is programmed at the microcontroller 484 and/or memory 488 to receive a command to operate the plurality of movable barrier operator head units 12, 12', 12", 12'''. The command may be sent from the wired switch module 439 or the wireless switch module 539 in response to actuation of a switch 439*j* or 539*j* (FIGS. 7 and 6), respectively, by a user to send the command to the system controller 410. In this approach, the system controller 410 is programmed to send a signal to start operation of the first movable barrier operator 12 of the plurality of movable barrier operator head units 12, 12', 12", 12''' in response to receiving the command. Then, the system controller 410 is programmed to send a signal to start operation of a second movable barrier operator 12' of the plurality of movable barrier operator head units 12, 12', 12", 12''' at a time subsequent to sending the signal to start the operation of the first movable barrier operator head unit 12. The signals may be sent via the wired network 440 or the wireless network 490. The subsequent time to send the signal to start operation of the second movable barrier operator head unit 12' may be any of several times suitable for controlling sequencing of the operator head units 12, 12', 12", 12''', such as those discussed above in reference to FIG. 1.

In another example configuration, the system for controlling operation of a plurality of movable barrier operators includes a network coupled to a plurality of movable barrier operator head units 12, 12', 12", 12'''. The network may be wired network 440 or a wireless network 490. A system controller 410 is coupled to the network and programmed to receive a command from the switch module 439 or 539 to operate the plurality of movable barrier operator head units 12, 12', 12", 12'''. In this configuration, the system controller 410 is programmed at the microcontroller 448 and/or memory 488 to send a signal to start operation of the plurality of movable barrier operator head units 12, 12', 12", 12''' in response to receiving the command. Then, the system controller 410 is programmed to receive confirmation signals from the movable barrier operator head units 12, 12', 12", 12''' indicating receipt of the start signal according to an arbitration of the confirmation signals. As described above with reference to FIG. 2, the arbitration may comprise any system to regulate the receipt of the confirmation signals. For instance, by one approach, the system controller 410 may be connected to the movable barrier operators through a wired network 440 controlled by a serial bus connection such that the arbitration of the confirmation signals comprises a serial bus connection signal arbitration system. Serial bus connections have known arbitration methods to control receipt of multiple signals by a portion of the network. The serial bus arbitration of signal control may be implemented, for example, in software in other, non-serial bus connected networks.

The system controller 410 in this configuration is programmed to then send a signal to start operation of a first movable barrier operator 12 of the plurality of movable barrier operator head units 12, 12', 12", 12''' according to an order of receipt of the confirmation signals via the arbitration of the confirmation signals. The system controller 410 is programmed to then send a signal to start operation of a second movable barrier operator head unit 12' of the plurality of movable barrier operator head units 12, 12', 12", 12''' according to the arbitration of the confirmation signals at a time after sending the signal to start the operation of the first movable barrier operator head unit 12.

Those skilled in the art will recognize and understand that a system as shown in FIG. 5 may be comprised of a plurality of physically distinct elements as is suggested by the illustrations. It is also possible, however, to view the illustrations as comprising a logical view, in which case one or more of these elements can be enabled and realized via a shared platform. For instance, one or more the functions controlled by the system controller 410 may be controlled instead or in combination with an operator controller circuit at each head unit 12, 12', 12", 12'''. It will also be understood that such a shared platform may comprise a wholly or at least partially programmable platform as are known in the art.

Figure 6:
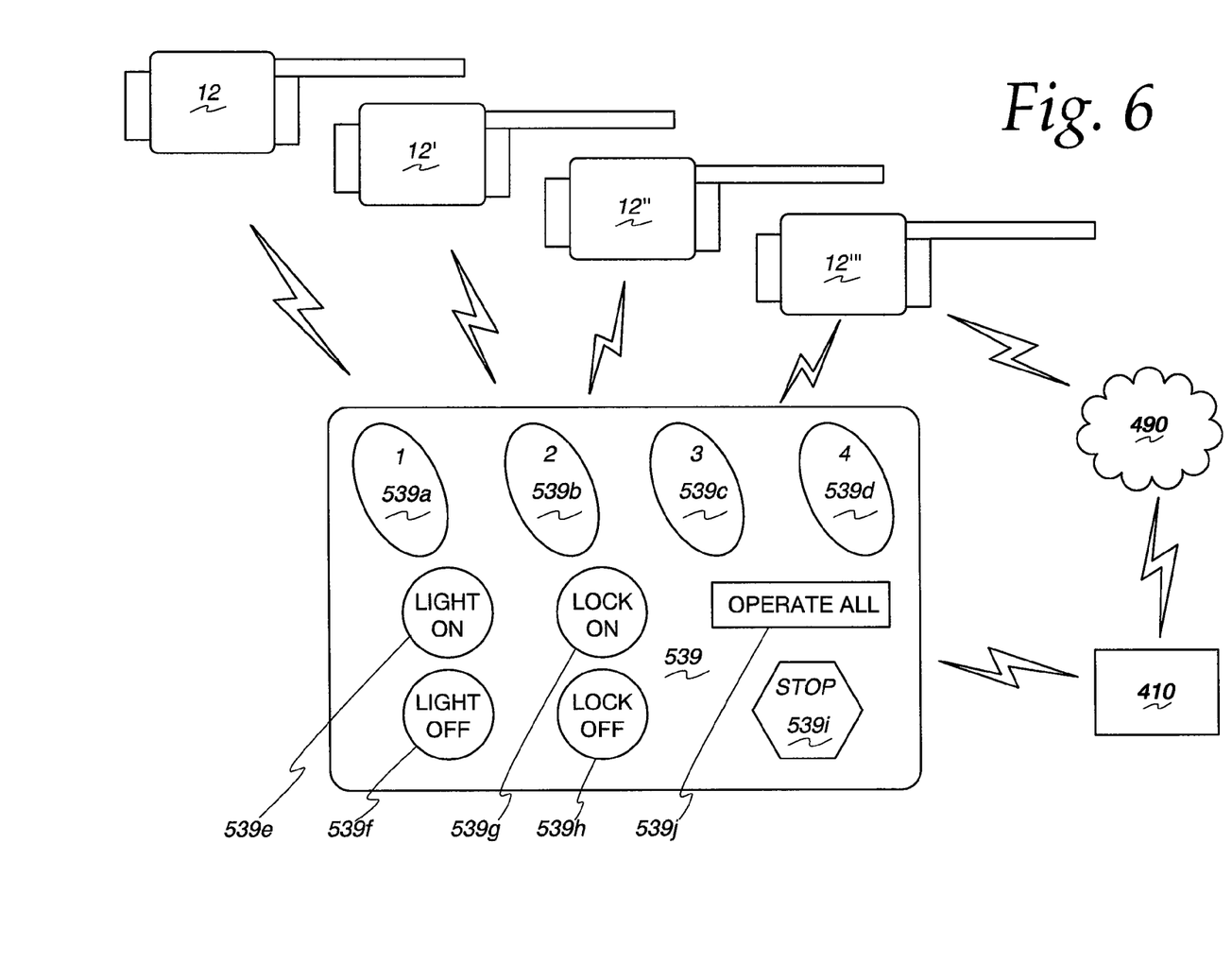
FIG. 6 comprises a block diagram of an example wireless switch module in an example system as configured in accordance with various embodiments of the invention.

Referring to FIG. 6, the wireless transmitter 30 of FIG. 4 is shown configured as a multi-button wireless switch module 539 in communication with the head units 12, 12', 12", 12''' for controlling operation of the barrier operators 10. Signals transmitted by the wireless switch module 539 are sent directly to the head unit for processing by the operator and/or to the system controller 410 (FIG. 5), which may also communication wirelessly with the barrier operator head units 12, 12', 12", 12''' either directly or through a wireless network 490. The wireless switch module 539 includes switches or buttons for controlling the various operations of each barrier operator. Four command switches 539a-539d individually control barrier movement for up to four barrier operators in combination (or alone) as previously learned by the operator head units 12, 12', 12", 12'''. The fifth and sixth switches 539e, 539f turn the overhead lights on and off, respectively. The seventh and eight switches 539g, 539h turn response inhibit mode on and off, respectively. The ninth switch 539i stops all barrier movement for all of the barrier movement operators. A tenth switch 539j operates all the barrier operator head units 12, 12', 12", 12''' as if all the command switches 539a-539d were pressed simultaneously.

For example, pressing the first switch 539a when the barrier or garage door is down causes the barrier operator head unit 12 to lift the door. Conversely, pressing the first switch 539a when the barrier is up, causes the operator head unit 12 to lower the door. For safety purposes, breaking the optical beam that runs between the optical emitter 42 (FIG. 4) and the optical detector 46 (FIG. 4) overrides the press of the first switch 539a and causes the door to stop or reverse direction. As mentioned above, the light switches 539e and 539f toggle the overhead barrier lights between off and on states, and lock switches 539g and 539h toggle the response inhibit mode between an active and inactive state. To notify a user that the barrier operator is in response inhibit mode, the barrier operator lights may be configured to blink when the switch 539g is pressed and the barrier operator transitions from non-response inhibit mode to response inhibit mode. When the barrier operator is in the response inhibit mode and a learned but inhibited signal is received, the barrier operator light may be configured to blink to remind the user that the operator is in the response inhibit mode.

Figure 7:
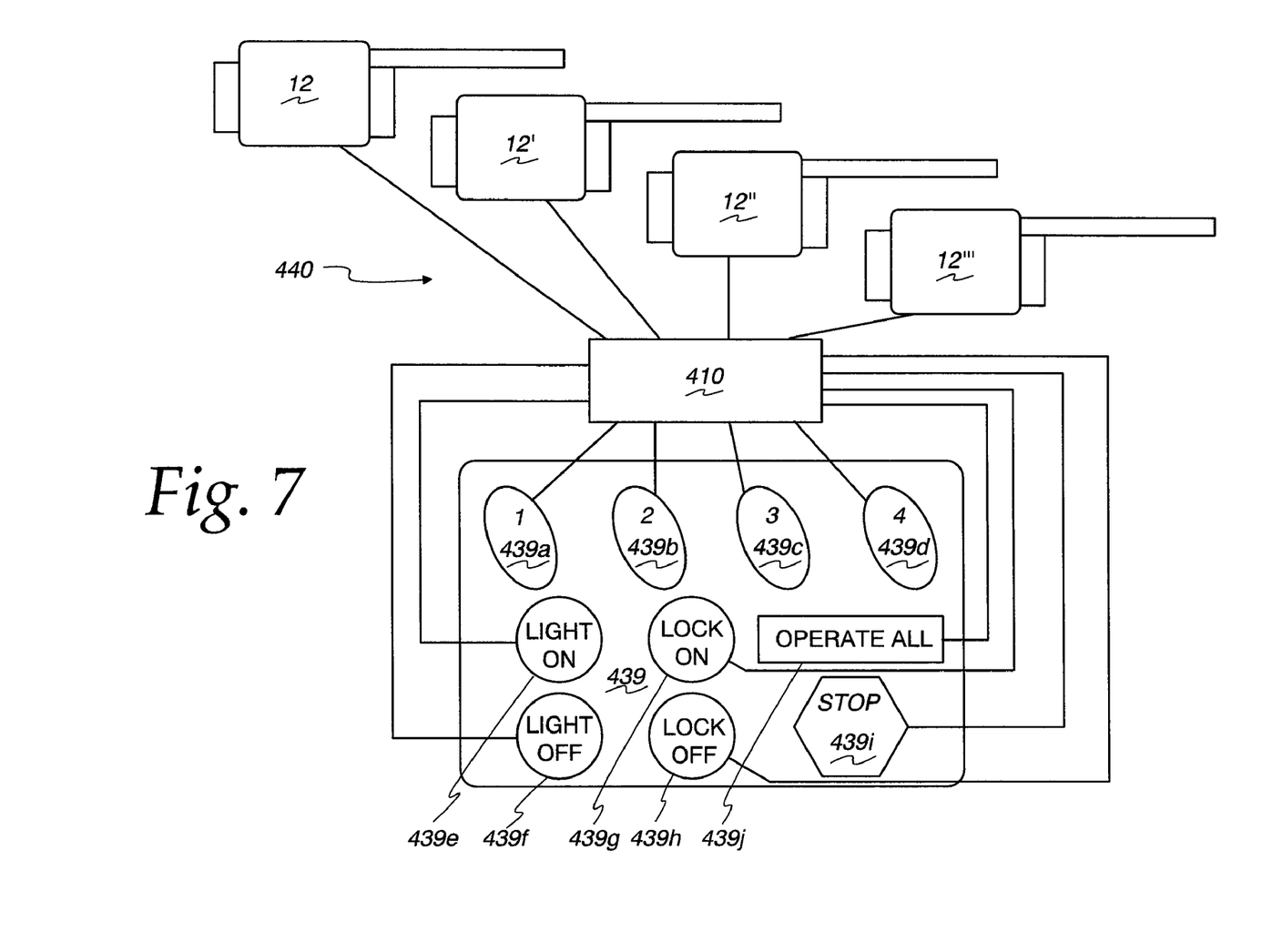
FIG. 7 comprises a block diagram of an example wired switch module in an example system as configured in accordance with various embodiments of the invention.

FIG. 7 shows an exemplary embodiment of a switch module 439 in a wired configuration. As illustrated, the switch module 439 is in communication with a plurality of head units 12, 12', 12", 12'''. Specifically, the first command switch 439a controls operation of the first head unit 12, the second command switch 439b similarly controls the second head unit 12', the third command switch 439c controls the third head unit 12", and the fourth command switch 439d controls the fourth head unit 12'''. The switches 439a, 439b, 439c, 439d first are routed through a hardware or software based system controller 410 that is located within the switch module 439, but may be located at any other suitable location in the network 440. The system controller 410 mediates commands between the switch module 439 and the head units 12, 12', 12", 12'''. In particular, the system controller 410 routes signals from the switches to barrier operators for which the button press was intended. Thus, when a first switch, or command switch, is pressed instructing the barrier to open, the system controller 410 receives the signal and routes it to the first head unit 12. The signals generated by the overhead light switches 439e, 439f, the response inhibit switches 439g, 439h, and the stop button 439i are routed to all of the barrier operator head units 12, 12', 12", 12''' by the system controller 410. Similar to the wireless switch module discussed previously, the barrier operators in the wired system may be trained to respond to particular switch modules. The operate-all switch 439j operates all the barrier operator head units 12, 12', 12", 12''' as if all the command switches 439a-439d were pressed simultaneously.

The switch modules as described above transmit fixed switch module codes along with switch identities. For increased security, the system may also be configured to operate using what are known as rolling codes. A rolling code system generally includes a transmitter having means for developing and transmitting a fixed code portion and a rolling or variable code portion. The fixed code portion includes the transmitter identifier (switch module code) based on the multiple trits described above for identifying the particular transmitter that transmitted the code. The rolling or variable code portion is changed with each actuation of the handheld transmitter and/or the switch module in accordance with a algorithm known to both transmitter and receiver. The fixed code remains the same for each actuation of the transmitter. The receivers, such as the barrier operators, in a rolling code system perform the same algorithm for predicting the rolling code for each transmission they receive from a transmitter they have learned. When the fixed code portion and rolling code portion of a received code match what is predicted, an operation is begun and an updated rolling code value is stored for future received code comparisons.

In the rolling code system, multiple handheld transmitters and the switch module maintain communication with the barrier movement operators even as rolling code values change through usage of the handheld transmitters and the switch module. The switch module of the present example stores one rolling code value that is used to calculate a next rolling code value for transmission when a transmission occurs. At the end of transmission, the "next" rolling code value is stored by the switch module to use in computing a further "next" rolling code value. Such operation continues with the rolling code value stored by the switch module being updated for each transmission.

As above described, all barrier movement operators may not respond to all transmissions from the switch module. For example, if command button 539a is learned by barrier movement operator head unit 12 only, the rolling code value of the switch module will be updated for each transmission and the rolling value of the barrier movement operator which responds to button 539a also will be updated. In order to maintain synchronism with the other barrier movement controllers that may have learned other buttons of the switch module, it has been found advantageous to advance the rolling code values of all barrier movement operators with each transmission from the switch module, regardless of whether the barrier movement operator actually performs an operation in response to the transmission. This is true even if the controller has not learned the specific switch button of the switch module represented in the received code. As such, each barrier operator is able to maintain a generally current roll value to enable communication with the switch module, even though it may not have been actuated recently by the switch module. It is to be noted that although all the controllers that detect a match with the switch module code increase their roll counts, only the particular controller or controllers trained specifically to the particular button being pressed execute the command function. And, as mentioned above, controllers that are not trained to the switch module transmitting the signal do not increment their roll counts because they do not recognize the switch module.

So configured, the system controller is programmed to control operation of the movable barrier operators such that operation of more than one movable barrier operator occurs in a sequence to reduce the chance that excess current is drawn by the operators at any one point in time. By so managing the operators' start up sequences, the multiple barrier operators are less likely trip circuit breakers for the garage, warehouse, or other structure in which the multiple barriers are disposed. Similarly, more sophisticated energy management for the structure, such as those structures as may have energy usage limits, may be assisted by such operator controller systems.

Those skilled in the art will recognize that a wide variety of modifications, alterations, and combinations can be made with respect to the above described embodiments without departing from the spirit and scope of the invention. For example, pairs or other combinations of barrier operators may be started together instead of only one operator at a time. In another example, multiple barrier operators may be triggered to operate by a user's pressing multiple individual operation buttons 539a-539d. The system controller 410 in such an approach may operate as discussed herein to sequence to the motors to limit the current draw from the operators. Such modifications, alterations, and combinations are to be viewed as being within the ambit of the inventive concept.

What is claimed is:

1. An apparatus for controlling operation of a plurality of movable barrier operators, the apparatus comprising:
 a system controller programmed to receive at least one command to operate a plurality of movable barrier operators, the system controller configured, upon receipt of the command, to communicate with the plurality of the movable barrier operators, and the system controller being programmed to:
  send a signal in response to the command to start the operation of a first movable barrier operator of the plurality of movable barrier operators; and
  send a second signal in response to the command to start the operation of a second movable barrier operator at a time subsequent to sending the signal to start the operation of the first movable barrier operator, the second signal being sent directly to the second movable barrier.

2. The apparatus of claim 1 wherein the time subsequent to sending the signal to start operation of the first movable barrier comprises at least one of a time group selected from the group consisting of:
 a time at which the system controller receives a signal from the first movable barrier operator that its movement is complete;
 a time at which the system controller receives a signal from the first movable barrier operator that its start up sequence is complete;
 a time at which the first movable barrier operator's movement is complete;
 a time at which the first movable barrier operator's start up sequence is complete; and combinations thereof.

3. The apparatus of claim 1 wherein the second signal is timed to limit the amount of current being drawn by the system in starting operation of the movable barrier operators to approximately 12 amps.

4. The apparatus of claim 1 further comprising a switch operable by a user to send the command to the system controller.

5. The apparatus of claim 1 further comprising a wired network that connects the system controller to the plurality of movable barrier operators.

6. The apparatus of claim 1 further comprising a wireless network that connects the system controller to the plurality of movable barrier operators.

7. An apparatus for controlling operation of a plurality of movable barrier operators, the apparatus comprising:
 a network coupled to a plurality of movable barrier operators;
 a system controller coupled to the network, the system controller programmed to receive a command to operate the plurality of movable barrier operators;

wherein the system controller is programmed to send a signal to start operation of the plurality of movable barrier operators in response to receiving the command;

wherein the system controller is programmed to receive confirmation signals sent from the movable barrier operators in response to receiving the signal to start operation, the system controller being programmed to receive the confirmation signals according to an arbitration of the confirmation signals;

wherein the system controller is programmed to send a signal to start operation of a first movable barrier operator of the plurality of movable barrier operators according to the arbitration of the confirmation signals; and wherein the system controller is programmed to send a separate signal directly to a second movable barrier operator to start operation of the second movable barrier operator of the plurality of movable barrier operators according to the arbitration of the confirmation signals at a time after sending the signal to start the operation of the first movable barrier operator.

8. The apparatus of claim 7 wherein the time after sending the signal to start the operation of the first movable barrier operator comprises at least one of a time group selected from the group consisting of:

a time at which the system controller receives a signal from the first movable barrier operator that its movement is complete;

a time at which the system controller receives a signal from the first movable barrier operator that its start up sequence is complete;

a time at which the first movable barrier operator's movement is complete;

a time at which the first movable barrier operator's start up sequence is complete; and combinations thereof.

9. The apparatus of claim 7 wherein the network comprises a wired network that connects the system controller to the plurality of movable barrier operators.

10. The apparatus of claim 9 wherein the wired network comprises a serial bus connection such that the arbitration of the confirmation signals comprises a serial bus connection signal arbitration system.

11. The apparatus of claim 7 wherein the network comprises a wireless network that connects the system controller to the plurality of movable barrier operators.

12. The apparatus of claim 7 further comprising a switch operable by a user to send the command to the system controller.

13. The apparatus of claim 7 wherein the time after sending the signal to start the operation of the first movable barrier operator is timed to limit an amount of current being drawn by the system in starting operation of the movable barrier operators to approximately 12 amps.

14. A method for controlling operation of a plurality of movable barrier operators to operate in a sequential manner to limit use of current, the method comprising:

receiving a command to operate a plurality of movable barrier operators;

sending a signal to the plurality of movable barrier operators to operate in response to receiving the command to operate the plurality of movable barrier operators;

receiving confirmation signals sent from the movable barrier operators in response to receiving the signal to start operation, the receiving of the confirmation signals being performed according to an arbitration of the confirmation signals; and sending a plurality of separate signals with individual ones of the plurality of separate signals sent directly to individual ones of the plurality of movable barrier operators, each signal configured to operate one of the plurality of movable barrier operators in an order of receipt of the confirmation signals according to the arbitration of the confirmation signals.

15. The method of claim 14 further comprising delaying operation of a movable barrier operator for a time after operating a first movable barrier operator in the order of receipt of the confirmation signals according to the arbitration of the confirmation signals.

16. The method of claim 15 wherein the time after operating the first movable barrier operator comprises at least one of a group comprising:

a time of receiving a signal from the first movable barrier operator that its movement is complete;

a time of receiving a signal from the first movable barrier operator that its start up sequence is complete;

a time at which the first movable barrier operator's movement is complete;

a time at which the first movable barrier operator's start up sequence is complete.

17. The method of claim 14 further comprising performing the method over a wired network.

18. The method of claim 14 further comprising performing the method over a wireless network.

19. The method of claim 14 wherein the step of operating the plurality of movable barrier operators in an order of receipt of the confirmation signals according to the arbitration of the confirmation signals is timed to limit an amount of current being drawn by the system in starting operation of the movable barrier operators to approximately 12 amps.

20. A method for controlling operation of a plurality of movable barrier operators to operate in a sequential manner to limit use of current, the method comprising:

receiving a command to operate a plurality of movable barrier operators;

sending a signal to a first movable barrier operator of the plurality of movable barrier operators to operate in response to receiving the command to operate the plurality of movable barrier operators; and sending a second signal to a second movable barrier operator of the plurality of movable barrier operators to operate in response to receiving the command to operate the plurality of movable barrier operators at a time after sending the signal to start the operation of the first movable barrier operator, the second signal being sent directly to the second movable barrier operator.

21. The method of claim 20 wherein the time after operation the first movable barrier operator comprises at least one of a group comprising:

a time of receiving a signal from the first movable barrier operator that its movement is complete;

a time of receiving a signal from the first movable barrier operator that its start up sequence is complete;

a time at which the first movable barrier operator's movement is complete; a time at which the first movable barrier operator's start up sequence is complete.

22. The method of claim 20 further comprising performing the method over a wired network.

23. The method of claim 20 further comprising performing the method over a wireless network.

24. The method of claim 20 wherein the time after sending the signal to start the operation of the first movable barrier operator is timed to limit an amount of current being drawn by the system in starting operation of the movable barrier operators to approximately 12 amps.

25. An apparatus for controlling operation of a plurality of movable barrier operators, the apparatus comprising:

a system controller programmed to receive at least one command to operate a plurality of movable barrier operators and configured upon receipt of the command to communicate with the plurality of the movable barrier operators, the system controller being programmed to send at least first and second signals in response to the command to start the operation of at least a first movable barrier operator and a second movable barrier operator of the plurality of movable barrier operators, the first and second signals being different from each other and sent directly to the first and second movable barrier operators respectively and communicating a delay time for at least one of the movable barrier operators.

26. The apparatus of claim 25 wherein the delay time for at least one of the movable barrier operators to be effective for limiting an amount of current being drawn by the system in starting operation of the movable barrier operators comprises at least one of a time group selected from the group consisting of:

a time at which the first movable barrier operator's movement is complete; and
a time at which the first movable barrier operator's start up sequence is complete.

27. The apparatus of claim 25 wherein the delay time is timed to limit the amount of current being drawn by the system in starting operation of the movable barrier operators to approximately 12 amps.

28. The apparatus of claim 25 further comprising a switch operable by a user to send the command to the system controller.

29. The apparatus of claim 25 further comprising a wired network that connects the system controller to the plurality of movable barrier operators.

30. The apparatus of claim 25 further comprising a wireless network that connects the system controller to the plurality of movable barrier operators.

31. A method for controlling operation of a plurality of movable barrier operators to operate in a sequential manner to limit use of current, the method comprising:

receiving a command to operate a plurality of movable barrier operators;
sending a first signal directly to a first movable barrier operator and a second signal different from the first signal directly to a second movable barrier operator of the plurality of movable barrier operators to operate in response to receiving the command to operate the plurality of movable barrier operators; and
including in the first signal to the first movable barrier operator and the second signal to the second movable barrier operator a delay time command to operate the second movable barrier operator at a delay time after the first movable barrier operator.

32. The method of claim 31 wherein the delay time after the first movable barrier operator comprises at least one of a group comprising:

a time at which the first movable barrier operator's movement is complete;
a time at which the first movable barrier operator's start up sequence is complete.

33. The method of claim 31 further comprising performing the method over a wired network.

34. The method of claim 31 further comprising performing the method over a wireless network.

35. The method of claim 31 wherein the delay time is timed to limit an amount of current being drawn by the system in starting operation of the movable barrier operators to approximately 12 amps.

36. The apparatus of claim 1 wherein the system controller is separate from the plurality of movable barrier operators.

37. The apparatus of claim 25 wherein the system controller is separate from the plurality of movable barrier operators.

* * * * *

UNITED STATES PATENT AND TRADEMARK OFFICE
CERTIFICATE OF CORRECTION

| | | |
|---|---|---|
| PATENT NO. | : 8,279,040 B2 | Page 1 of 1 |
| APPLICATION NO. | : 12/246966 | |
| DATED | : October 2, 2012 | |
| INVENTOR(S) | : Laird | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this
Fifteenth Day of July, 2014

Michelle K. Lee
*Deputy Director of the United States Patent and Trademark Office*